United States Patent [19]
Nowobilski et al.

[11] Patent Number: 5,324,159
[45] Date of Patent: Jun. 28, 1994

[54] PARTICLE LOADER

[75] Inventors: Jeffert J. Nowobilski, Orchard Park; James S. Schneider, Akron, both of N.Y.

[73] Assignee: Praxair Technology, Inc., Danbury, Conn.

[21] Appl. No.: 955,769

[22] Filed: Oct. 2, 1992

[51] Int. Cl.5 .................................... B65G 65/32
[52] U.S. Cl. ................................. 414/301; 414/299
[58] Field of Search ............ 414/158, 179, 189, 195, 414/299, 300, 301, 302; 193/3, 14, 23

[56] References Cited

U.S. PATENT DOCUMENTS

| | | | |
|---|---|---|---|
| 565,068 | 8/1896 | Dornfeld | 414/302 X |
| 2,655,273 | 10/1953 | Snow | 414/301 |
| 2,895,625 | 7/1959 | Clark | 414/302 |
| 3,265,225 | 8/1966 | Louks | 414/302 |
| 3,339,760 | 9/1967 | Louks | 414/302 |
| 3,487,961 | 1/1970 | Neuenschwander | 414/301 X |
| 3,739,926 | 6/1973 | Easton | 414/302 X |
| 3,780,887 | 12/1973 | Bottoms | 414/299 |
| 3,838,524 | 10/1974 | Hencke et al. | 34/10 |
| 3,964,892 | 6/1976 | Schumacher et al. | 414/301 X |
| 3,972,686 | 8/1976 | Johnson et al. | 23/288 R |
| 4,040,529 | 8/1977 | Wurdeman et al. | 414/301 |
| 4,159,785 | 7/1979 | Berry, Jr. | 222/63 |
| 4,162,960 | 7/1979 | Dhondt | 414/301 X |
| 4,216,914 | 8/1980 | O'Hanlon | 414/301 X |
| 4,352,623 | 10/1982 | Smiley | 414/302 X |
| 4,440,806 | 4/1984 | Muri | 414/301 X |
| 4,921,086 | 5/1990 | Klutz et al. | 193/23 X |
| 4,986,422 | 1/1991 | Poturaev | 209/326 |

FOREIGN PATENT DOCUMENTS 0108372 8/1979 Japan ........................ 414/300

Primary Examiner—Michael S. Huppert
Assistant Examiner—James Keenan
Attorney, Agent, or Firm—Alvin H. Fritschler

[57] ABSTRACT

A uniformly packed bed of adsorbent particles is formed using a particle loader adapted to provide a uniform flow of adsorbent particles across the cross sectional area of an adsorption vessel.

12 Claims, 9 Drawing Sheets

5,324,159

PARTICLE LOADER

BACKGROUND OF THE INVENTION

1. Field of the Invention

The invention relates to the loading of vessels with absorbent material. More particularly, it relates to the loading of adsorbents so as to achieve a uniform packing thereof throughout the vessels.

2. Description of the Prior Art

In the practice of the pressure swing absorption (PSA) or thermal swing adsorption (TSA) technology in which a more readily adsorbable component of a feed gas is selectively adsorbed in a bed of adsorbent material, the overall performance achieved is sometimes less than expected and desired for practical commercial applications. One cause for such sub-par performance is a non-uniform density of the adsorbent particles in adsorbent vessels resulting from the particle loading techniques commonly employed in the art.

For example, adsorbent particles are commonly transferred from a shipping drum into a processing vessel by simple dumping of the adsorbent material from the shipping drum into the vessel through a top flange portion thereof. The adsorbent material flows into the vessel and forms a cone generally in the center portion thereof, with adsorbent particles reaching the wall of the vessel by sliding down the sides of the cone and outward toward said wall. This particle loading approach results in a center region of high particle packing density, an outer region close to the vessel wall of lower particle packing density, and an intermediate, variable density region.

In order to overcome this non-uniform particle packing density, a series of deflector cones having a center hole have been placed in the vessel immediately under the inlet opening thereof. As the adsorbent particles being loaded flow into the vessel, they strike the cones and are deflected in an outward direction toward the wall of the vessel. This approach tends to spread the particles out from the center cone, and to create a somewhat more uniform particle packing density. It has not been found to be effective, however, with respect to larger sized, commercially significant vessels having diameters of over about 6 feet, some of the flowing particles do not have sufficient energy to enable them to be dispersed to the outer region at the wall of the vessel. This approach is also disadvantaged by its need to accurately position a uniform inlet stream of particles in the center of the series of cones. This is very difficult to achieve since the particles are being powered from a large drum, e.g. a 55 gallon drum, through a flexible hose into the inlet flange of the vessel.

As those skilled in the art will appreciate, another set of problems can also arise in vessel loading due to drum-to-drum variations in the particles being loaded, and the particular method of loading employed. If, for example, the particles are poured into the vessel in accordance with common practice, it has been observed that all of the material from one shipping drum will tend to collect in one area of the bed. This material may be more or less reactive, or somewhat larger or smaller in size, than the overall average of the bed. This also will result in areas of adsorbent material non-uniformity in the bed, which will decrease the efficiency of the adsorption process carried out in the vessel.

If, for the reasons indicated above, a non-uniform particle packing exists in an adsorption vessel, a non-uniform flow of fluid therethrough will be observed. Thus, as the fluid approaches the bed of particle material at a uniform pressure, either at the top or the bottom of the adsorbent bed, the flow of such fluid will be less through the dense central region thereof than through the looser, less densely packed outer edge sections thereof. Such variation in particle density from the center to the outer edge portion of the bed will generally be greater as the diameter of the vessel is increased. This results from the greater shearing action the particles undergo as they move from the center to the outer edge of the adsorbent bed in the vessel. In this regard, it should be noted that, for relatively small sized vessels, e.g. in the 1 to 4 feet diameter range, nearly uniform densities can be achieved because the center region of the particle cone will nearly fill the entire vessel. For larger vessels, however, the center region of the particle cone will not fill the entire vessel and non-uniform packing of the particles will be observed. In such large vessels, it has also been observed that small variations in bed density can lead to large changes in the velocity of gas flow through the bed since said velocity through the packed bed is a strong function of the particle packing density. It is such non-uniform flow conditions, caused by a non-uniform packing of particles in the vessel, that results in the above-indicated disappointing levels of adsorption performance that can be encountered in larger size, commercially significant operations.

In light of these circumstances, there is a genuine need for further development of the particle loading techniques used in commercial practice. In particular, there is a need for such development leading to a more uniform packing of adsorbent particles, especially for use in the loading of larger sized adsorption vessels.

It is an object of the invention, therefore, to provide an improved apparatus for the loading of adsorption vessels.

It is another object of the invention to provide an apparatus for achieving a uniform packing of adsorbent throughout an adsorption vessel.

With these and other objects in mind, the invention is hereinafter described in detail, the novel features thereof being particularly pointed out in the appended claims.

SUMMARY OF THE INVENTION

A particle loader is provided with a series of holes therein such as to enable adsorbent or other particle flow therethrough such as to obtain a uniform loading of particles over the cross sectional area of a vessel. The loader comprises either a rotatable conduit, or a stationary perforated plate used in conjunction with fluidized bed conditions, to achieve a uniform flow therefrom across the cross-sectional area of the adsorption or other vessel so as to obtain a uniformly packed bed of particles in the vessel.

BRIEF DESCRIPTION OF THE DRAWINGS

The invention is hereinafter further described in detail with reference to the accompanying drawings in which.

DETAILED DESCRIPTION OF THE INVENTION

The objects of the invention are accomplished by a particle loader apparatus and method that enables adsorbent or other particles to be loaded into a vessel with a uniform passage of the particles over the cross-sectional area of the vessel. As described below particularly with respect to the loading of adsorbent material into an adsorption bed, the invention provides either for the rotation of the particle loader apparatus, or of movement of the adsorbent particles relative to a stationary particle loader apparatus, so that a uniform flow of adsorbent particles through the vessel is achieved across the cross-sectional area thereof over the course of a particle loading operation. The uniform packing of the adsorption vessel achieved in the practice of the invention results in significantly enhanced gas production upon use of the resulting uniform, densely packed adsorption vessel in PSA or other adsorption fluid separation operations.

In the practice of the invention in its various embodiments, the adsorbent particles are caused to fall at a uniform rate over the cross sectional area of the adsorption vessel to achieve the desired uniform density throughout the bed. Depending on the particle flow rate onto the adsorbent bed being formed, the uniform bed packing can vary from a random dense to a random loose packing. A random dense packing in the bed of uniform packing is caused by each of the falling particles from the particle loader of the invention coming to rest on the bed surface before another particle being loaded into the vessel contacts it. In this circumstance, each particle falls completely into a valley formed by the other particles already in the bed. If, on the other hand, the falling particles contact each other before coming to rest on the bed surface, frictional forces between the particles will keep them from rolling into a valley formed by other particles in the bed. A random loose particle packing will result. In either case, a uniform density will be achieved throughout the bed.

Figure 1:
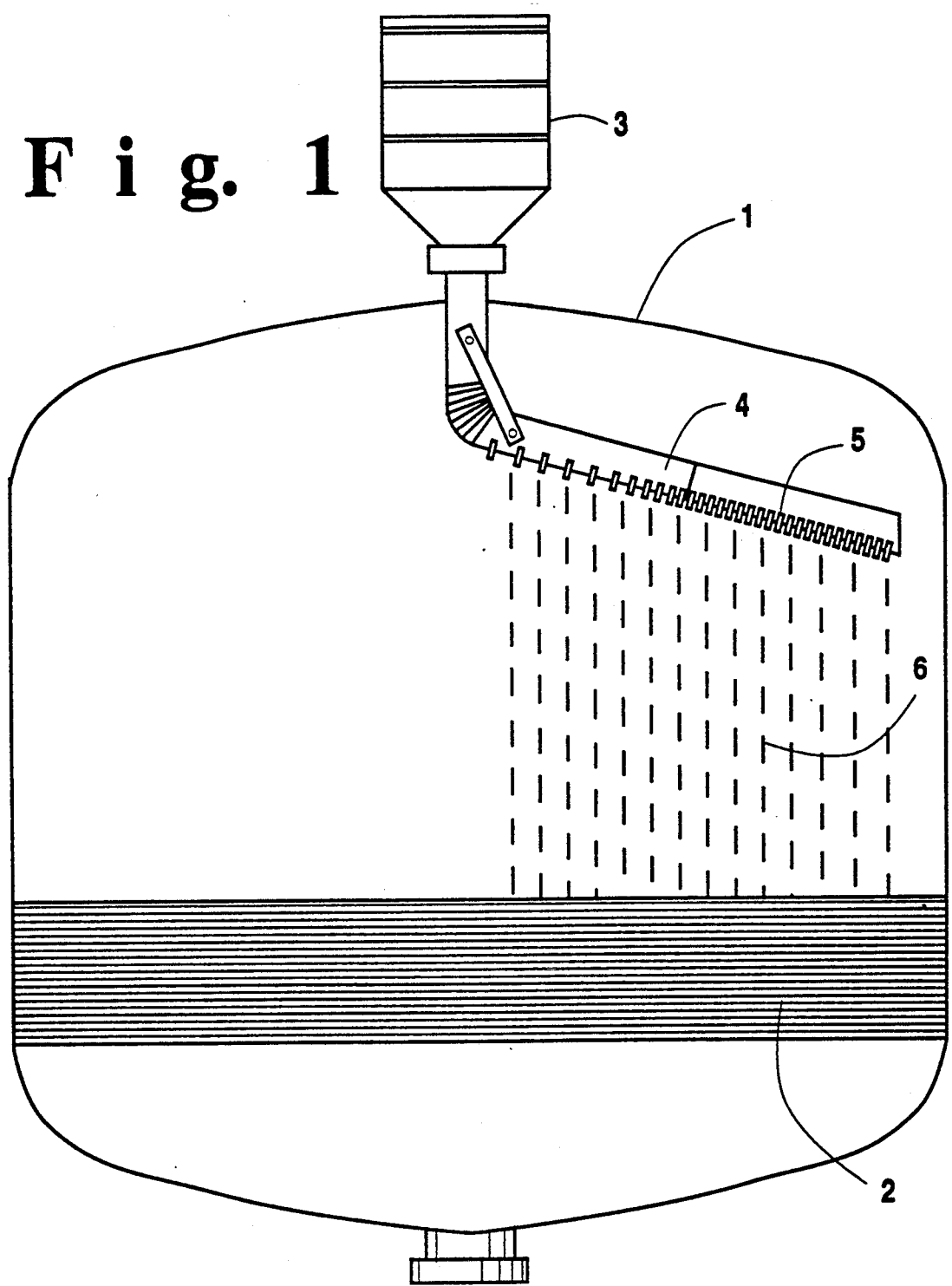
FIG. 1 is a schematic side elevational view of an adsorption vessel containing the particle loader of the invention.
Figure 2:
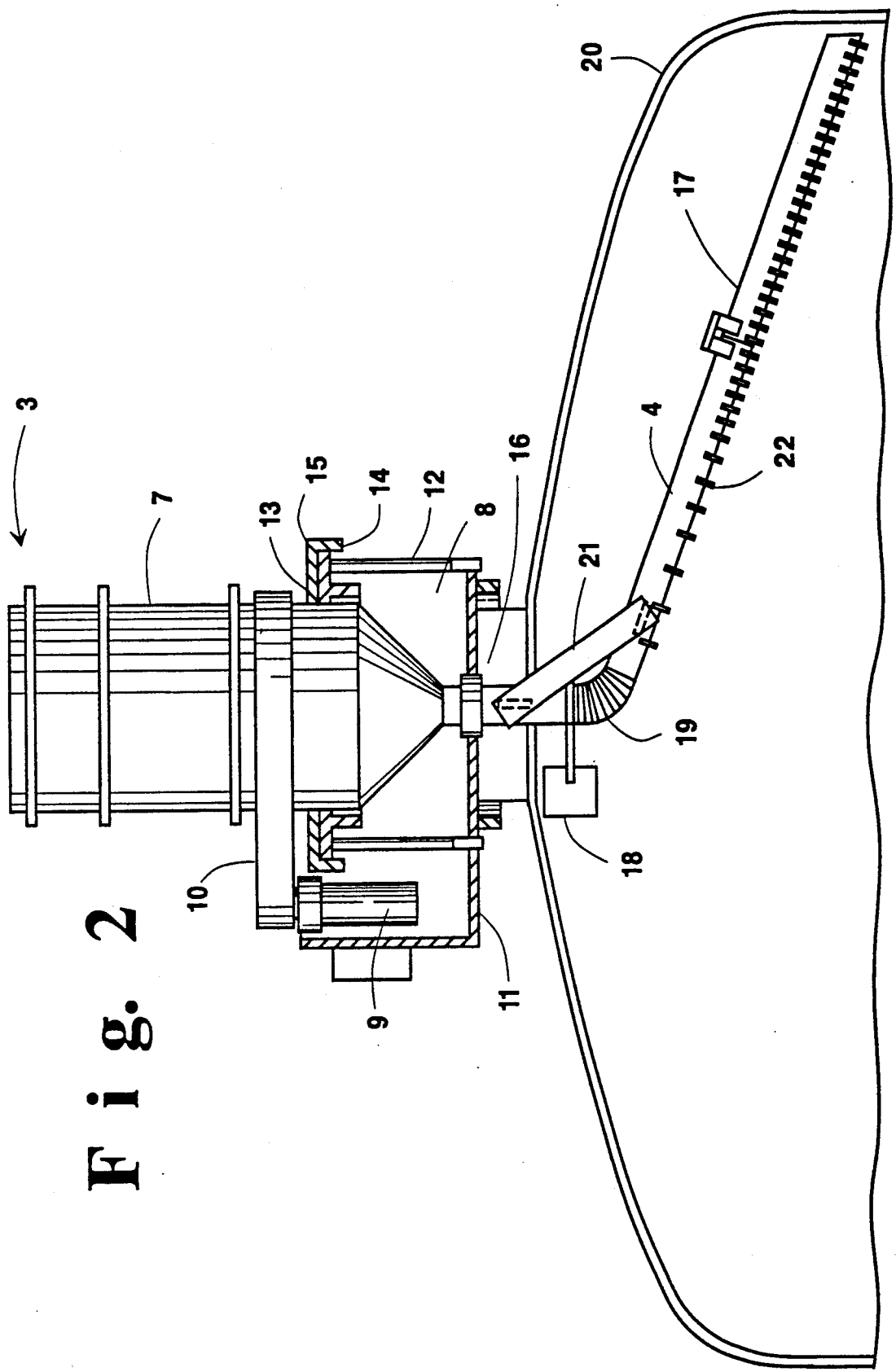
FIG. 2 is a schematic side elevational view of the particle loader positioned on the adsorption vessel and illustrating a flow control arrangement facilitating the loading of adsorbent material in the vessel.

With reference to the drawings, FIG. 1 illustrates an embodiment of the invention in which a rotary arm particle loader is employed in a vertical cylindrical adsorption vessel. The adsorption vessel is denoted by the numeral 1, with a bed 2 of adsorbent particles being formed therein. For this purpose, particle loader assembly 3, containing a feed hopper and drive means, is mounted on top of adsorption vessel 1 and is in controlled fluid communication with rotary arm 4 positioned in the upper portion of adsorption vessel 1 during the adsorbent particle loading operation. Rotary arm 4 comprises a conduit containing a series of holes 5 positioned to allow particles to flow out the bottom thereof onto bed 2. The holes are sized or arranged so that the particle loading per square foot of bed area is uniform over the cross-sectional area of the bed. While the holes are typically round, it will be understood that the holes can be any suitable shape desired for a given application. Upon rotation of rotary arm 4, therefore, it sweeps the entire cross sectional area of vertical adsorption vessel 1, with adsorbent particles falling in an essentially uniform flow of particles 6 to create a uniform packing of additional adsorbent particles as part of bed 2 being formed in adsorption vessel 1. Details of particular loader assembly 3 are shown in FIG. 2 of the drawing.

In the practice of the illustrated embodiment of the invention, the feed hopper portion of particle loader assembly 3 and rotary arm 4 are both rotated by said drive means. In FIG. 2, particle loader assembly 3 is shown as comprising adsorbent feed hopper 7 and feed cone 8 from which adsorbent particles flow into rotary arm 4. Drive means are provided to rotate feed hopper 7, feed cone 8 and rotary arm 4. For this purpose, variable speed drive motor 9 is used to drive belt 10 adapted to drive feed hopper 7. The particle loader assembly is supported on mounting plate 11 affixed to the upper portion of adsorption vessel 1 through support arms 12 and rotary bearing 13 supported thereby. Rotary bearing 13 consists of two L-shaped flanges, one being fixed flange 14 mounted on mounting plate 11 by means of support arms 12, and the other being rotating flange 15 secured to feed hopper 7. The contacting faces of rotating flange 15 are covered with a suitable low friction bearing material, such as Roulon J, a "Teflon" based self-lubricating, low friction bearing material.

Particle loader assembly 3 also includes on-off particle control value 16 positioned under feed cone 8 to control the flow of adsorbent particles from the feed hopper and feed cone to rotary arm 4. The control valve enables feed hopper 7 to be filled prior to starting the flow of absorbent particles to rotary arm 4 for the loading of adsorption vessel 1. Rotary arm 17, which is in fluid communication with such shutoff control valve 16 has a counterweight 18 attached thereto for balance, and includes elbow portion 19 made of a suitable flexible hose and adapted to enable rotary arm 17 to be set at various angles on the adsorption vessel denoted by the number 20. Rotary arm 17 is set in place at a desired angle by means of its flexible elbow portion 18 and support bracket 21 connected to rotary arm 17 above and below said elbow portion 19. The rotary arm angle employed in any particular application will depend on a number of factors, such as the internal friction of the adsorbent particles, the inside diameter of rotary arm 17, the friction between the arm and the adsorbent particles, and the like. Such friction between the adsorbent particles and the rotary arm can be reduced by coating the inside surface of the rotary arm with a low friction material such as "Teflon". This will generally enable a smaller rotary arm angle from the horizontal to be employed and more of the bed being filled with adsorbent material, as well as minimizing any bridging tendency of the adsorbent particles at the holes in the rotary arm. The smallest feasible rotary arm angle is generally desirable because this allows the highest adsorbent bed level to be achieved using the particle loader of the invention. The final setting of the arm angle for a rotary arm 17 having holes 22 therein, typically of uniform diameter, is desirably such as to have equal flow of particles out of the first and last holes along the length of the arm. This is conveniently determined by collecting and weighing the particle flow out of the holes over a given period of time. For embodiments in which a varying hole diameter is employed, the same procedure can be used, but the particle flow has to be divided by the bed area that is filled by that hole.

In established commercial practice, the absorbent material employed in adsorption operations is typically a 8×12 mesh size molecular sieve material, with the adsorption vessel typically being 12' in diameter. For such operations, a rotary arm of about 5', 10" radius, schedule 40, 4" pipe, e.g. ⅛' thick aluminum tubing is conveniently employed. Such a rotary arm, denoted by the numeral 23 in FIG. 3, has holes 24 distributed along the length thereof on the underside portion thereof to enable adsorbent particles to pass therethrough and fall in the vessel to the bed of adsorbent being loaded therein. An aluminum or other suitable end plate 25 is welded to the outer end of the rotary arm to preclude the uncontrolled flow of absorbent material through the rotary arm for discharge from such outer end rather then through holes 24 as desired. While said holes 24 are typically 7/16" in diameter for a rotary arm of the indicated size, it will be understood that the hole diameter can vary, and different sized holes can be employed, as desired, to provide a particular uniform flow therethrough as rotary arm 23 is rotated, so as to uniformly distribute the adsorbent particles in the bed being loaded in the adsorption vessel. For the indicated 4" diameter rotary arm pipe, the hole size will typically be in the range of from ⅜" to ¾". In general, the minimum hole diameter will typically be about 6 times the diameter of the adsorbent particles being passed through the rotary arm. Small hole/adsorbent particle diameter ratios will tend to result in intermittent plugging of the holes due to particle bridging across the holes.

Figure 3:
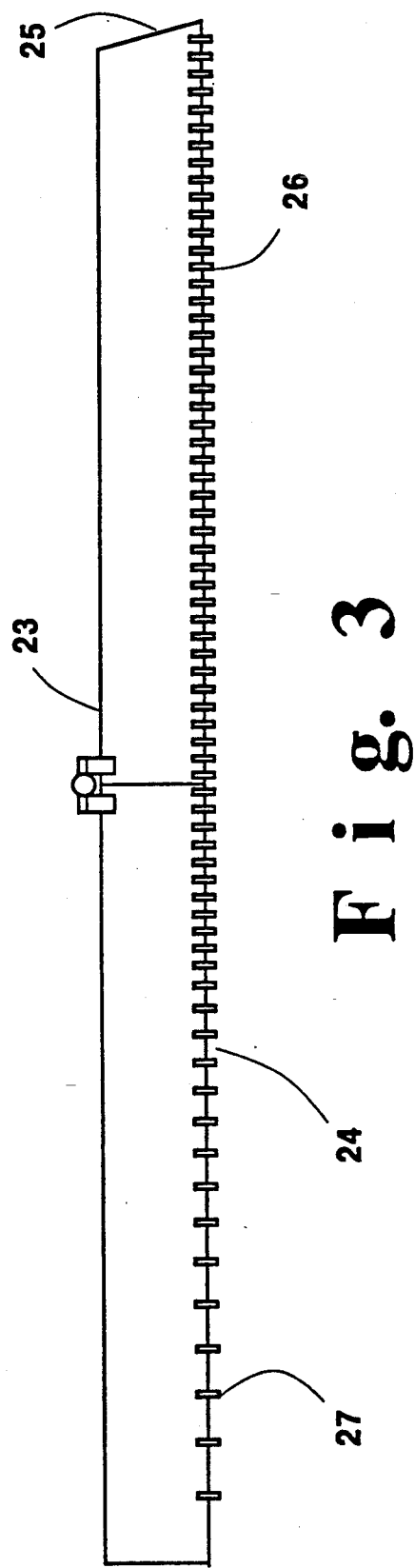
FIG. 3 is a side elevational view of a preferred embodiment of the particle loader of the invention.

It is within the scope of the invention to employ holes in the underside of rotary arm 23 that are more closely positioned, i.e. with more holes per given length of rotary arm, at the outer end of rotary arm 23, i.e. as by such close positioning designated by numeral 26 in FIG. 3, in contrast to the more spaced apart positioning of holes, designated by the numeral 27, in the vicinity of the end of rotary arm 23 close to its connection to the feed hopper, feed cone and control value referred to above with respect to FIG. 2.

In typical practice, the rotary arm will conveniently extend outward in the adsorption vessel, by means of its flexible elbow portion referred to above, at various rotary arm angles, with angles to the horizontal of 10° to 30° being preferred, and an angle of 20° being most preferred. The rotary arm will rotate at a suitable rotational speed so that the particles will be discharged through the holes in the rotary arm and fall into the adsorbent bed being formed at a rate such as to provide the desired uniform bed backing density desired for a given adsorption operation. The rotary arm will typically be rotated at a speed of from 20 RPM to 0.02 RPM, with a speed of from 2 RPM to 4 RPM being optimum for many applications and resulting in a uniform random dense packing of 42 lbs/ft$^3$ for the adsorbent bed formed thereby. It will be understood, however, that other such operating conditions may be employed within the scope of the invention.

Figure 4A:
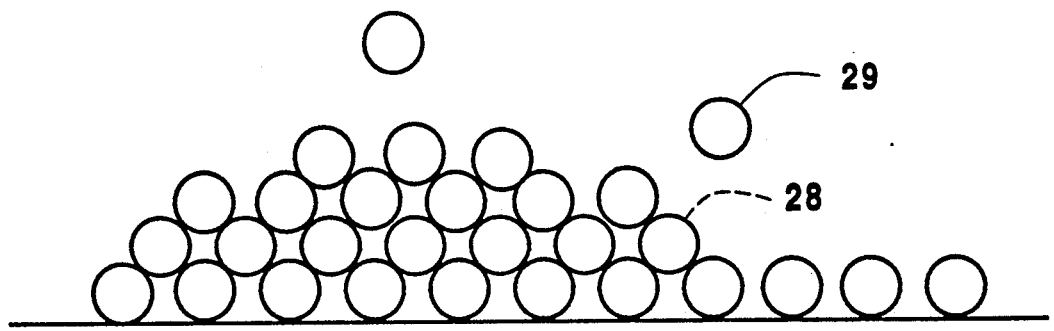
FIG. 4 is a side elevational view of the packing of adsorbent particles in the adsorption vessel, with FIG. 4a representing a dense packing achievable in the practice of embodiments of the invention, and FIG. 4b representing a loose packing achievable in the loading of adsorption particles in the vessel in the practice of other embodiments of the invention.
Figure 4B:
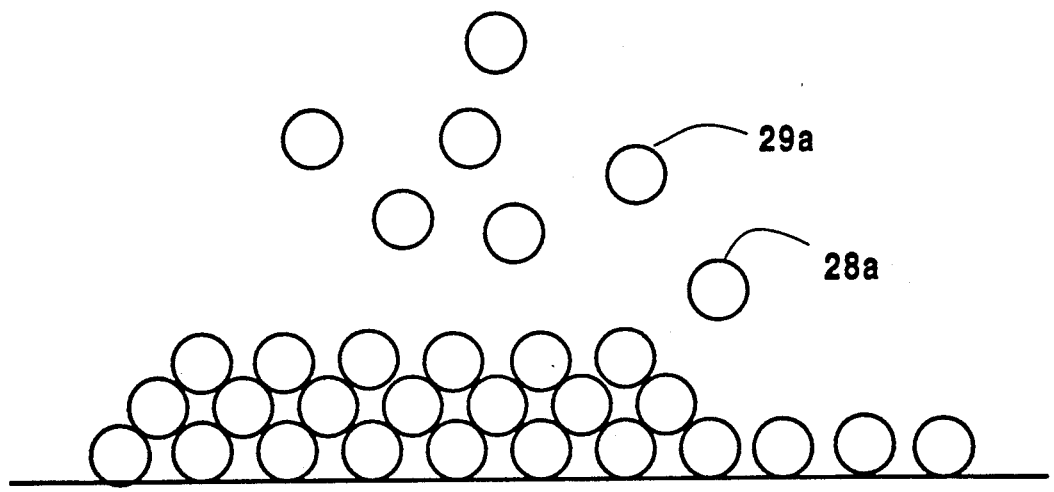
Figure 5:
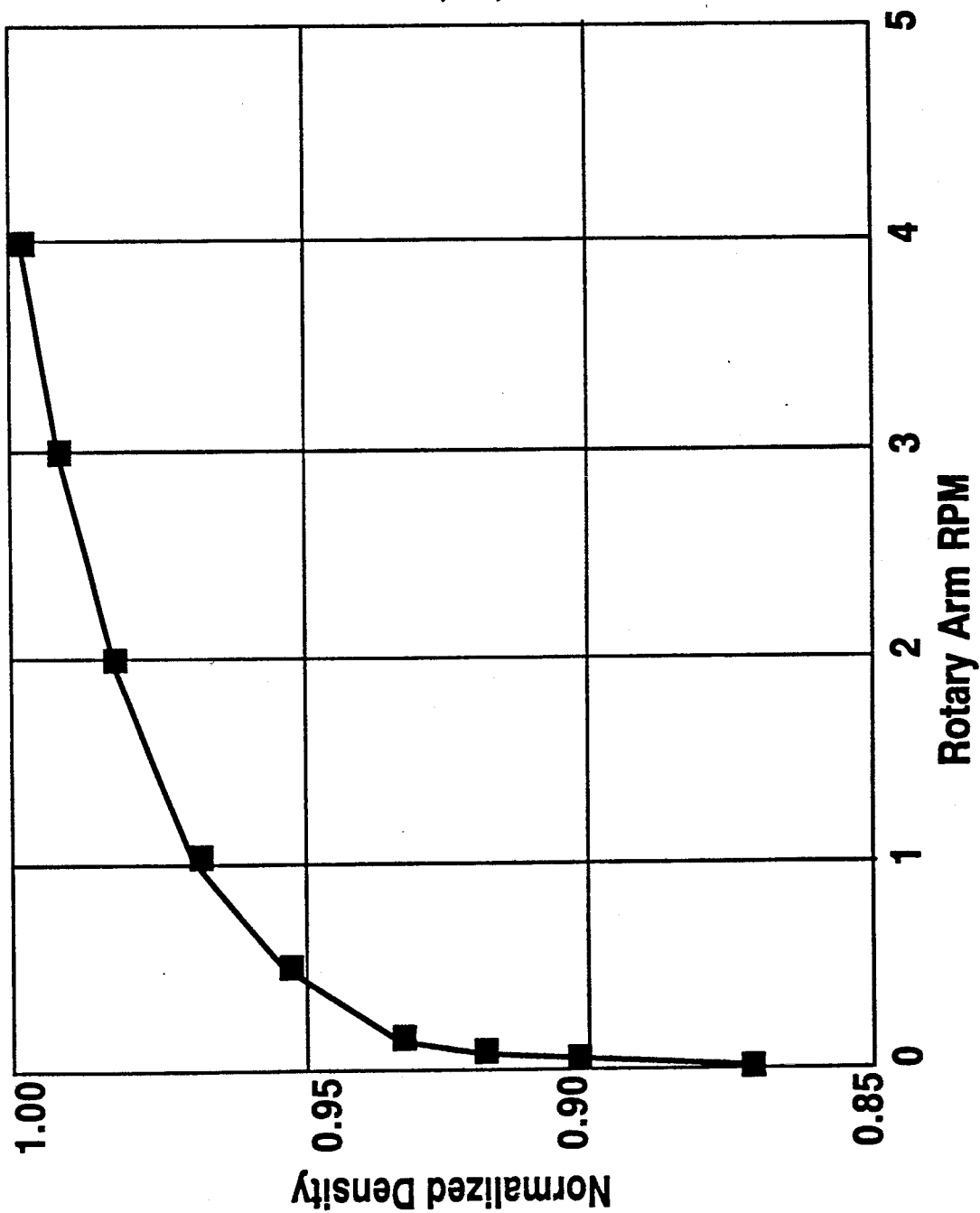
FIG. 5 is a graph showing the dependence of particle density on the rotational speed of the rotatable particle loader of the invention.

In the operation of the particle loader of the invention, the density or void fraction of the adsorbent bed formed in an adsorption vessel is determined by the rotational speed of the rotary arm. Upon setting the rotary arm and the particle loader assembly for rotation at a constant speed, the bed density will be uniform over its entire volume. This is due to the rate of particle coverage per unit area of the bed being constant over the entire cross section of the bed. Such uniform rate of coverage results in particle-to-particle interactions, i.e. as the particles come to rest on the surface of the bed, being on the average the same for all of the particles in the bed. At high rotary arm rotational speeds, each particle can generally come to rest on the bed surface before it is contacted by another particle falling from the rotary arm. This results in a random dense packing of adsorbent particles as illustrated in FIG. 4a. The particles that have come to rest, i.e. particles 28, tend to be nested in the valleys between the particles beneath them, resulting in the dense packing of said particles 28 before additional falling particles 29 come in contact with such particles 28. As the rotational speed of the rotary arm is reduced, the falling particles start to interact with previously deposited particles before coming to rest on the top thereof. In this case, the deposited particles are not nested in the valleys beneath them, and this causes the particles in the bed to be packed looser because the frictional forces between the adjoining particles will keep them from falling into the valleys of other particles on the bed. At very slow rotational speeds, essentially all of the particles falling into the bed, i.e. particles 29a, undergo interaction with other falling particles 29a, and a random loose packing of particles 28a is achieved as will be seen in FIG. 4b. Thus, by changing the rotational speed of the rotary arm, the packing density can be varied from a random dense to a random loose packing. For 8×12 molecular view adsorbent with a sieve density of 1.01 g/cc, i.e. 63 lb/ft$^3$, a random dense packing of 0.67 g/cc, i.e. 42 lb/ft$^3$, has been achieved in a 12' diameter vessel at 4 RPM. A random loose density of 0.51 g/cc, i.e. 38 lb/ft$^3$, can be achieved at very low rotational speeds of about 0.02 RPM. The functional dependence of packing density on the RPM of the rotary arm is illustrated in FIG. 5 of the drawing. The results shown therein are based on tests using 8×12 mesh sieve particles of 1 g/cc sieve density flowing through ⅜" diameter holes and covering a 1.57 ft$^2$ bed area. The particle flux corresponding to said results were 0.08 to 16 cm$^2$/S-cm$^2$. The volume flow of particles was based on the packed bed density and the time required to fill the desired adsorbent vessel.

An advantageous feature of the invention is that the packing is uniform throughout the bed. This results from having each hole in the rotary arm distribute its particles over an equal area in one revolution of the rotary arm. For equal size holes, the distribution of the holes can be such that $\pi r_{i+1} - \pi r_i^2 =$ a constant, where r is the horizontal hole location on the arm, with the constant being equal to the bed area that each hole is intended to cover and fill. This hole distribution is shown in FIG. 3 for the constant equal to 1.57 ft$^2$. Constant bed particle density is very important since it insures uniform fluid velocity flow through the adsorbent bed, thus achieving a desired full bed utilization. If the packing density is low in the center of the bed, the fluid velocity in the center portion of the bed will be higher than such velocity in the rest of the bed. This will result in an early breakthrough of the more selectively adsorbable component of a fluid mixture, thereby undesirably shortening the life of the adsorbent bed.

For relatively small adsorption vessels, the rotary arm is made shorter by removing the outer length thereof. The hole spacing therein from the center line of the vessel to the outer radius of the rotary arm is kept the same as for a larger vessel, e.g. for the 12' vessel of the FIG. 3 embodiment. For larger sized adsorption vessels, the rotary arm is made longer and additional holes are added, advantageously in accordance with the formula referred to above. It is also within the scope of the invention to employ multiple rotary arms in large adsorption vessel embodiments, particularly where higher fluid feed rates are desired upon use of the adsorbent loaded adsorption vessel for fluid separations.

In adsorption operations in which the adsorption particles being used are not spherical, the particle shape may cause the adsorbent pieces not to fall in valleys formed by the particles beneath them in the adsorbent bed being formed. In this case, a shaking of the adsorbent bed can be used to overcome this effect. The movement of the bed would rock the particles on the top surface into a more densely packed position.

Figure 6:
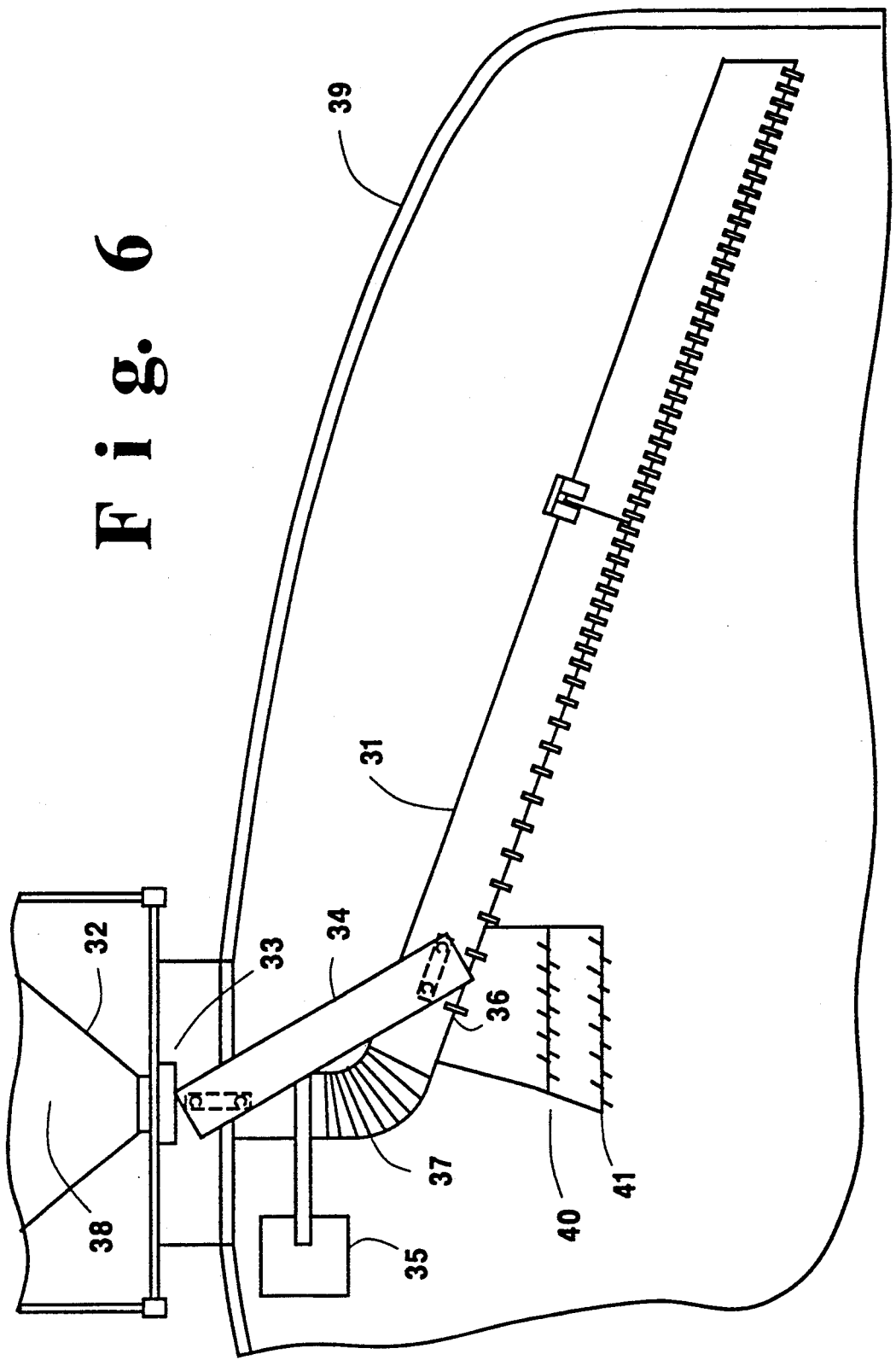
FIG. 6 is a schematic side elevational view of the particle loader positioned in the adsorption vessel and containing distribution screens to enhance the desired distribution of particles throughout the vessel.

In some circumstances, it is desirable to employ a screen or screens for the first few holes nearest to the center line of the vessel as well as means to achieve a wider distribution area at the outer end of the arm. A variation of the invention to include such screens is shown in FIG. 6 of the drawings to aid particle distribution at the center of the vessel. In FIG. 6, rotary arm 31 is in fluid communication with feed cone 32 having shut off valve 33 positioned thereunder. Said rotary arm 31 is secured in a desired position by means of support bracket 34 and counterweight 35 is advantageously employed as part of the support structure. In a typical arrangement, the first hole 36 in rotary arm 31 below elbow portion 37 thereof is located conveniently at 6" horizontally from centerline 38 of adsorption vessel 39. Hole 36 feeds the central 1.57 ft$^2$ area of the adsorption vessel. An adsorbent particle falling from a 7/16" diameter hole 36 may not cover the full center area in some cases. In order to spread the adsorbent particles out over the center area, distribution screens, preferably a series of large mesh, e.g. 4×4 screens, such as screens 40 and 41, are advantageously positioned below at least first hole 36, or, as shown, said first hole and at least one additional more widely distributed hole in rotary arm 31. As adsorbent particles fall from feed cone 32 into rotary arm 31, those particles that fall through first hole 36 contact said screens 40 and 41 and are distributed over a larger area in the center portion of adsorption vessel 39. As shown in FIG. 6, the lower positioned screen means, e.g. screen 41, are desirably oriented outward to accommodate the outwardly falling particles from the screen means positioned thereabove, e.g. screen 40.

Figure 7:
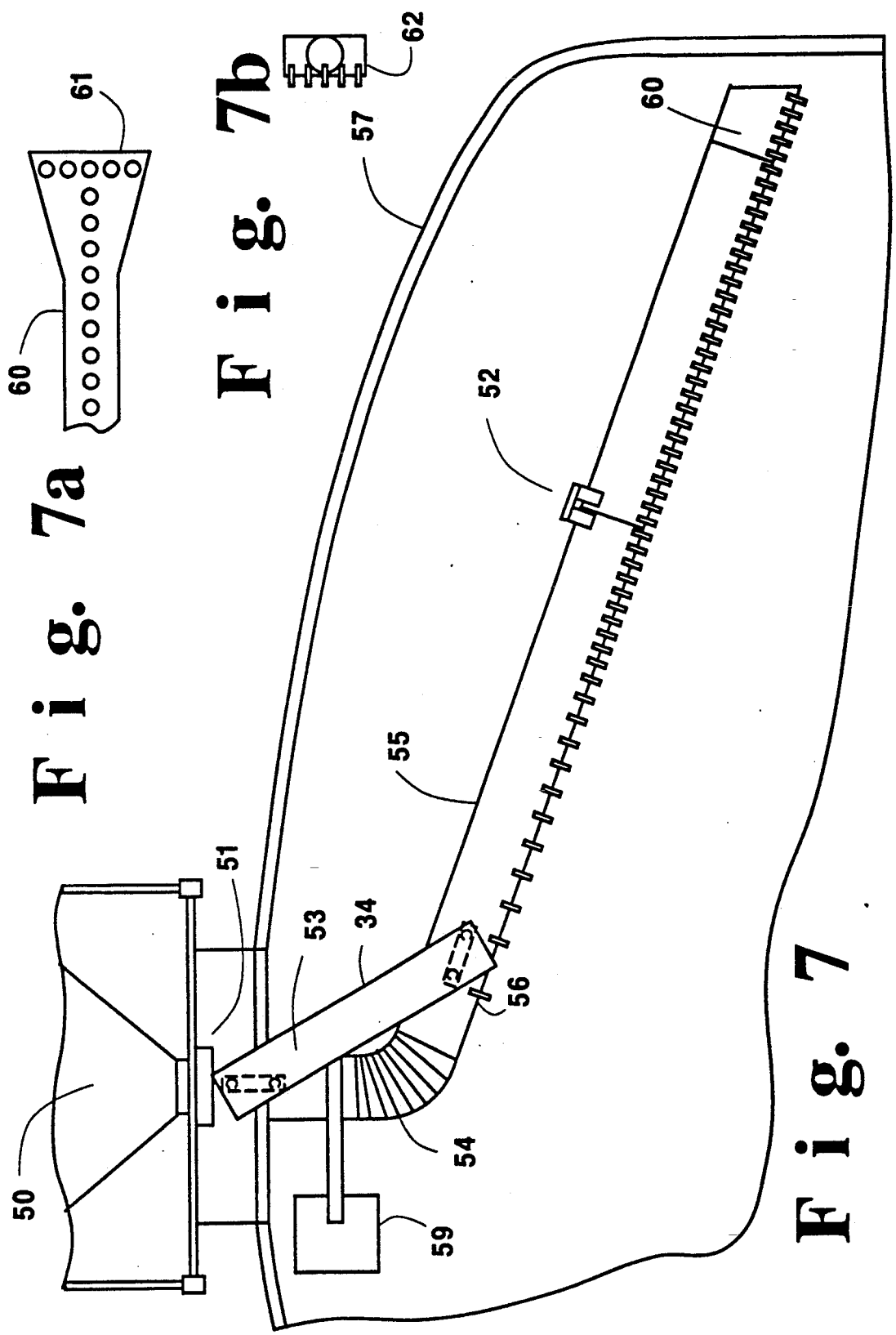
FIG. 7 is a schematic view illustrating an expanded particle loader rotary arm embodiment of the invention, with FIG. 7a illustrating a bottom view of the expanded rotary arm end, and with FIG. 7b illustrating an end view thereof.

The use of a wider area at the end of the rotary arm to aid particle distribution at the edge of the adsorption vessel is shown in FIG. 7 of the drawings. In such embodiments, feed cone 50 and shut off valve 51 are used to deliver adsorbent particles to rotary arm 52 having an upper portion 53, an elbow portion 54 and outward portion 55 containing holes 56 in the bottom side thereof for the flow of said particles downward in adsorption vessel 57 as an adsorbent bed is loaded in said vessel. Rotary arm 52 has its lower portion 55 extending downward and outward toward the wall of said vessel 57, the rotary arm being maintained at a desired angle by means of support bracket 58, supplemented by counterweight 59. In the illustrated embodiment, outward portion 55 has a widened section 60, i.e. an expanded arm end, to allow for added holes in the bottom portion at the end of said rotary arm 52. Such holes are illustrated by holes 61 as shown in FIG. 7a. Such widening of the rotary arm, as to the rectangular configuration 62 shown in FIG. 7b, and the providing of holes 61 enables the flow of adsorbent particles to desirably reach the wall of adsorption vessel 57. In typical, generally convenient embodiments of the invention, the rotary arm, or loader arm, of the invention is 1" to 2" shorter than the inside radius of the adsorption vessel. As a result, the outer area where the wall of the vessel does not directly receive adsorbent particle flow, and the illustrated embodiment of FIG. 7 compensates for this circumstance. Thus, a suitable mass flow in the area near the wall of the vessel is advantageously achieved. In the practice of said embodiment, small shoots can, if desired, be positioned at the outer holes in the rotary arm to deflect the particles outward the wall of the adsorption vessel. It will further be understood that a variable particle flow from the rotary arm into the adsorption vessel can also be achieved, in the practice of the invention, by means of variable hole sizing at a constant hole spacing, or a combination of variable hole size and variable hole spacing.

Figure 8:
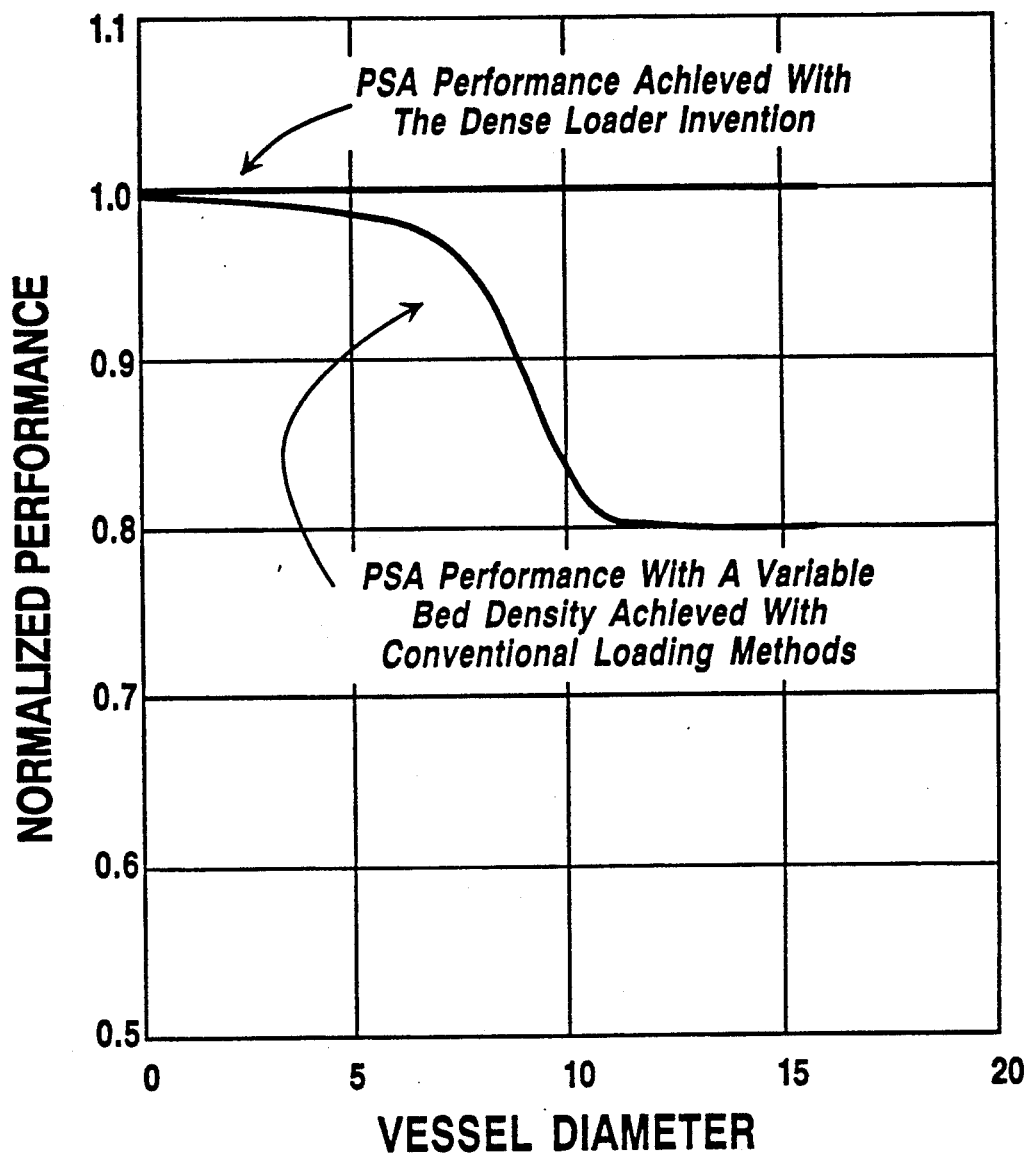
FIG. 8 is a graph illustrating the improved PSA performance obtainable using the particle loader of the invention to achieve a dense uniform adsorbent bed packing in contrast to the variable bed density of conventional particle loading methods.

It has been determined, from practical field experience, that uniformity of the packed density of the bed becomes particularly important as the diameter of the adsorption vessel is increased. FIG. 8 of the drawing shows normalized bed performance plotted against bed diameter for beds loaded in accordance with the practice of the intention and for beds loaded in the conventional manner referred to above. For relatively small adsorption vessel diameters, e.g. up to about 5 ft, a normalized PSA performance of nearly 1 is achieved for a densely packed bed of 42 lb/ft$^3$ loaded by the particle loader of the invention. For a conventionally loaded, variable density bed, PSA performance decreases slightly as the vessel diameter increases up to about 5 ft., but a packed bed density of 0.95 is achieved at a packing of 38 lb/ft.$^3$. Flow maldistribution in the adsorbent bed is not a serious problem under such conditions. As the vessel diameter is increased to 6' and larger, however, PSA performance of the conventionally loaded bed decreases significantly relative to the bed loaded in the practice of the invention. For a 12 ft. diameter bed loaded using the rotary arm apparatus of the invention, a bed density of 42 lb/ft.$^3$ is again achieved, and the normalized PSA performance is still 1. For the same bed loaded in the conventional manner, an average density of about 38 lb./ft.$^3$ is achieved, but the normalized PSA performance factor falls to only 0.8. Such large reduction in PSA performance, at vessel diameters of 6' and above, is due to flow maldistribution in the adsorption vessel. Such maldistribution is caused by the existence of bed areas of low particle density at the outer edges of the bed, with the resulting passage therethrough of larger flows of a fluid being separated in the adsorption vessel, and bed areas of high particle density in the center of the bed, resulting in the passage therethrough of a smaller flow of said fluid. These field results show that the conventional loading approach results in non-uniform bed densities; or void fractions, which severely degrade the performance of PSA or other adsorption processing. The loading approach of the invention results in a uniform bed density, or void fraction, which maintains uniform flow through the bed, and, therefore, a bed performance that is independent of the bed diameter. As will be appreciated, particularly from the results indicated in FIG. 8, this is most critical in larger plants using larger adsorption process vessels, e.g. vessels of 6' diameter and above. In another embodiment of the invention, a weeping fluidized bed is used, instead of the rotary arm referred to above, to achieve a uniform loading of adsorbent particles in an adsorption vessel. In this approach, as illustrated in FIG. 9 of the drawings, a perforated plate is placed in the upper head space of the vessel, and a gas flow is passed upward through the adsorption vessel, with adsorbent particles being poured onto the perforated plate at a controlled rate for weeping, i.e., falling, of particles through downcomer holes in the plate at a uniform rate across the cross sectional area of the plate.

Figure 9:
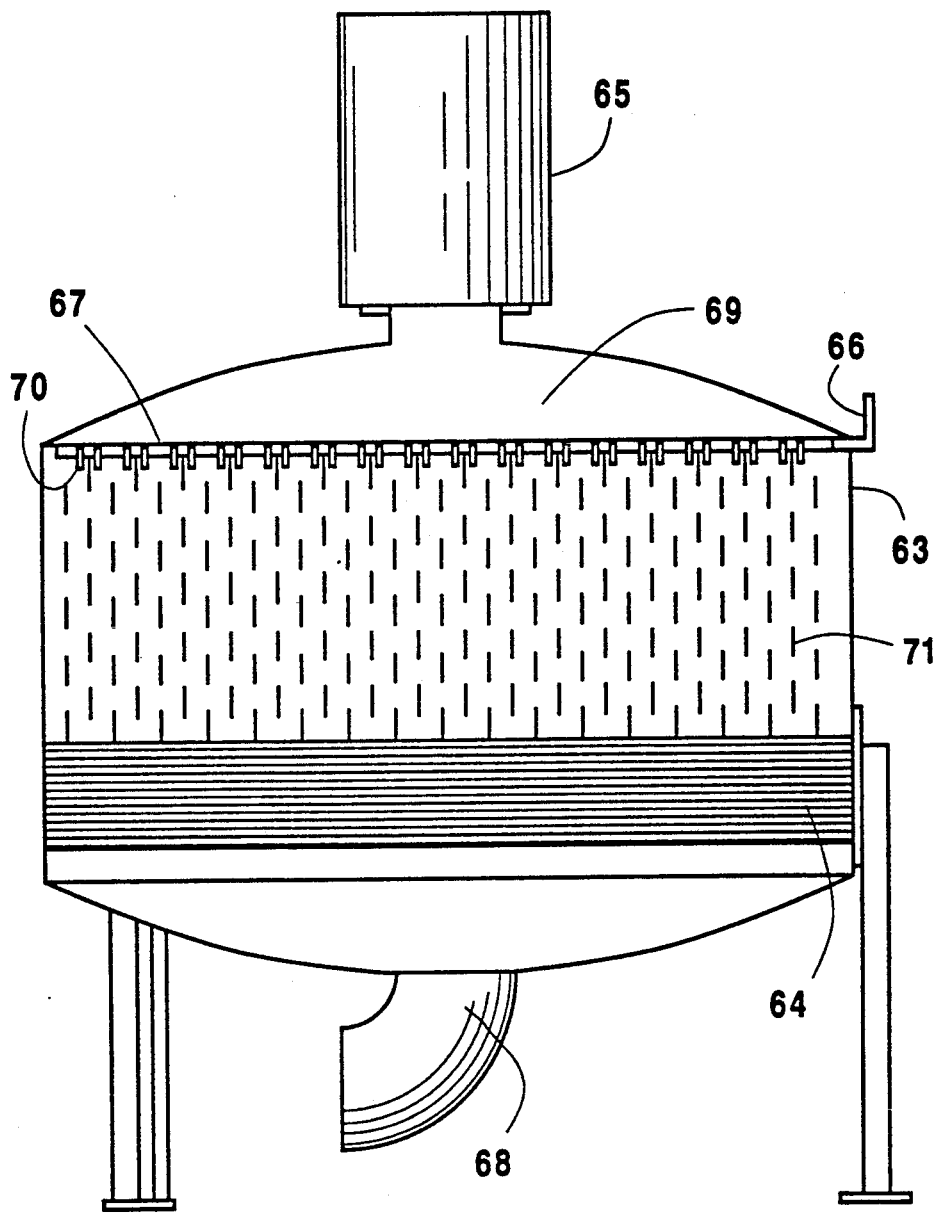
FIG. 9 is a schematic side elevational view of a fluidized bed particle loader embodiment of the invention.

In the embodiment of FIG. 9, an adsorption vessel 63, in which an adsorbent bed 64 is being loaded, has feed hopper and gas exit device 65 positioned on top thereof in fluid communication with the interior thereof. Distributor plate 66 is provided in the head space of the vessel, said distributor plate having small perforations or holes 67 uniformly positioned throughout the cross sectional area of the plate. Gas inlet means 68 are provided to cause an air or other gas flow to pass upward throughout said vessel 63. Said gas flow will pass upward through holes 67 in perforated plate 66 and out of the top of the vessel through feed hopper and gas exit device 65.

The gas flow through small holes 67 serves to keep the adsorbent particles poured onto distribution plate 66 in the vessel in a fluidized state. Thus, the level of fluidized bed 69 created immediately above said plate 66 is maintained constant across said perforated plate and enables the uniform loading of adsorbent particles in adsorbent bed 64 to be achieved. The adsorbent particles in fluidized bed 69 flow through downcomer holes 70 that are of a convenient design that enables said particles to fill the downcomer and fall through the holes therein in an adsorbent weeping fashion in a uniform manner across said distributor plate 66. Thus, downcomer holes 70 are uniformly spaced over the entire area of the plate and allow the desired constant flow of adsorbent particles through each hole since the fluidized bed height is constant across perforated distribution plate 66. The uniformly falling stream of particles 71 across the sectional area of adsorption vessel 63 results in a particle flow per unit area onto fixed adsorbent bed 64 below the perforated plate that is uniform since, as indicated above, the downcomer holes are uniformly spaced over the perforated plate and the adsorbent particle flow downward through each plate is the same.

Those skilled in the art will appreciate that various changes and modifications can be made in the details of the invention without departing from the scope of the invention as recited in the appended claims. Thus, the invention can be used with any suitable combination of hole size and hole spacing to achieve the desired uniform flow of adsorbent particles through the rotary arm, or the distributor plate used with a fluidized bed, to achieve a uniform packing of adsorbent particles in the bed formed during the absorbent loading operation. In the particular rotary arm referred to above, adapted for positioning in a 12',6" adsorption vessel, is conveniently 4" outside diameter, ¼" thick aluminum tubing having, in a typical embodiment, 7/16" diameter holes positioned on the underside thereof for the flow of adsorbent particles therethrough. A total of 68 such holes are employed in an illustrative embodiment of the invention, with the holes being more spaced apart in the vicinity of the center line of the adsorption vessel than at the outer portions thereof. The rotary arm can be made in more than one segment, as, for example, in the embodiment described above, having a first section near the centerline of the vessel, downstream of the elbow portion, of 38", with said first section being attached to a second section of 39.95" extending outward toward the adsorption vessel wall by suitable hinge or other securing means. Such details of the rotary arm can be modified, however, to accommodate the requirements of a given particle loader application. As indicated above, the speed of rotation of the rotary arm can be varied depending on the nature of the adsorbent bed packing arrangement desired. Similarly, the fluidized bed of the particles in the FIG. 9 embodiment of the invention can be varied to provide for a desired flow rate of adsorbent particles through the downcomers positioned on the distributor plate to provide for a desired weeping or falling of adsorbent particles through the adsorption vessel onto the adsorbent bed being loaded therein.

While the invention has been described with reference to the loading of a vertical adsorption vessel containing a cylindrical bed, e.g. as shown in FIG. 1 and 9, it will be appreciated that the particle loader of the invention can be used with respect to other bed configurations, such as a verticle cylinder containing a radial flow bed arrangement, or a cylindrical vessel arranged in a horizontal position. In such a horizonal vessel, the rotary arm could conveniently traverse the vessel on a supporting track attached to the sides of the vessel above the adsorbent bed. The velocity of the rotary arm could be kept constant, except at the heads of the vessel since more adsorbent material would be needed to fill the curved head area at each end of the vessel.

While the invention has been described particularly with respect to the loading of a bed of adsorbent material, those skilled in the art will appreciate that it can be used in other applications, as in catalyst loading, to obtain a uniform packing of the particles being loaded into a vessel.

The invention provides a practical and highly advantageous advance in particle loading, particularly in the adsorption field. By enabling adsorbent material to be packed more densely than in conventional practice, the invention enables more adsorbent material to be placed in a given size adsorption vessel in applications where dense particle loading is desired. In all applications, the invention enables the adsorbent particles, at any desired density level, to be packed uniformly throughout the cross sectional area of an adsorption vessel. Such uniform packing enables a uniform flow of feed fluid to be achieved through the bed when used in practical commercial fluid separation operations, particularly in large size adsorption vessels. The dramatic increase in oxygen production of 20% achieved in a 12' diameter vacuum PSA oxygen system in which adsorbent particles were loaded by use of the particle loader of the invention illustrates the highly significant nature of the invention. Such improved performance can likewise be obtained in variety of fluid separation adsorption operations, such as air separation for nitrogen production as well as oxygen production, hydrogen/methane separations and a variety of other well known separations carried out using adsorption technology. As the production rate requirements for PSA and other adsorption plants increases to satisfy the ever growing requirements of industrial operations throughout the world, larger diameter adsorption vessels are generally employed. As the particle loader of the invention is used in conjunction with such larger diameter adsorption vessels, the greater is the percentage improvement in product production obtained upon use of the adsorption vessels in practical commercial operations.

We claim:

1. A particle loader apparatus for loading particles into a vessel comprising:
  (a) feed hopper means for providing a supply of particles to be loaded in a vessel having an upper portion and a wall;
  (b) feed cone means positioned below the feed hopper means to facilitate the passage of particles from the feed hopper means;
  (c) a rotary arm positioned below said feed cone means and in the upper portion of the vessel and extending in length downward in the vessel from the center portion of the vessel to the vicinity of the wall thereof, said rotary arm being adapted for the flow and distribution of particles passing to the vessel from the feed hopper means along the length of the downwardly extending length of said rotary arm, with said rotary arm having an upper portion at the centerline of the vessel, an elbow section and a lower portion extending outward and downward in the direction of the wall of the vessel, said lower portion of the rotary arm having holes therein positioned so that particles passing therethrough fall in a uniform flow pattern across the cross sectional area of the vessel as the lower portion of the rotary arm is rotated in the vessel;
  (d) drive means for the rotation of said feed hopper means, feed cone means and rotary arm, the lower portion of said rotary arm thereby being moved in a rotational pattern around the interior of the vessel in the upper portion thereof; and
  (e) control means positioned between the feed cone means and said rotary arm and adapted to control the passage of particles from said feed hopper means into said downwardly extending rotary arm, said control means being rotatable by said drive means, whereby a uniformly packed bed of particles can be formed upon loading of the vessel thereby.

2. The apparatus of claim 1 in which said lower portion of the rotary arm extends downward at an angle of from 10° to 30° to the horizontal.

3. The apparatus of claim 4 in which said drive means are adapted to rotate said rotary arm, said control means, said feed cone means, and said feed hopper means at a rotational speed of from 20 rpm to 0.02 rpm.

4. The apparatus of claim 3 and including rotary bearing means facilitating the rotation of the rotary arm, control means, feed cone means, and said feed hopper means.

5. The apparatus of claim 1 in which the outer end of the rotary arm is closed to preclude the flow of particles through the rotary arm and out the end thereof.

6. The apparatus of claim 1 and including distribution screens positioned under the holes in the lower portion of the rotary arm in the vicinity of the centerline of the vessel, thereby facilitating distribution of particles in the center portion of the vessel.

7. The apparatus of claim 1 and including an expanded outer end section of the lower portion of the rotary arm, said expanded section having additional holes therein facilitating the distribution of particles near the wall of the vessel.

8. The apparatus of claim 1 in which the vessel is an adsorption vessel to be loaded with absorbent particles.

9. The apparatus of claim 1 and including a coating of low friction material on the inside surface of the rotary arm.

10. A particle loader apparatus for loading particles into a vessel comprising:
  (a) feed hopper means for providing a supply of particles to be loaded in a vessel having an upper portion and a wall;
  (b) feed cone means positioned below the feed hopper means to facilitate the passage of particles from the feed hopper means;
  (c) a rotary arm positioned below said feed cone means and in the upper portion of the vessel and extending in length downward in the vessel from the center portion of the vessel to the vicinity of the wall thereof, said rotary arm being adapted for the flow and distribution of particles passing to the vessel from the feed hopper means along the length of the downwardly extending length of said rotary arm, with said rotary arm having an upper portion at the centerline of the vessel, an elbow section and a lower portion extending outward and downward in the direction of the wall of the vessel, said lower portion of the rotary arm having holes therein positioned so that particles passing therethrough fall in a uniform flow pattern across the cross sectional area of the vessel as the lower portion of the rotary arm is rotated in the vessel, said holes being spaced further apart near the centerline of the vessel and closer together along the outer length of said lower portion of the rotary arm;
  (d) drive means for the rotation of said feed hopper means, feed cone means and rotary arm, the lower portion of said rotary arm thereby being moved in a rotational pattern around the interior of the vessel in the upper portion thereof; and
  (e) control means positioned between the feed cone means and said rotary arm and adapted to control the passage of particles from said feed hopper means into said downward extending rotary arm, said control means being rotatable by said drive means, whereby a uniformly packed bed of particles can be formed upon loading of the vessel thereby.

11. The apparatus of claim 10 and including rotary bearing means facilitating the rotation of the rotary arm, control means, feed cone means, and said feed hopper means.

12. The apparatus of claim 10 in which the lower portion of the rotary arm extends downward at an angle of from 10° to 30° to the horizontal.

* * * * *